United States Patent [19]

Hansen et al.

[11] 4,134,523
[45] Jan. 16, 1979

[54] VENTED PISTON FOR BARRIER PRESSURE CONTAINERS

[75] Inventors: Harold M. Hansen, Westfield; Edward J. Towns, Convent Station, both of N.J.

[73] Assignee: Southern Can Company, Tuckahoe, N.Y.

[21] Appl. No.: 795,455

[22] Filed: May 9, 1977

[51] Int. Cl.² .............................................. B67D 5/54
[52] U.S. Cl. ...................................... 222/389; 138/42; 239/322
[58] Field of Search ............... 222/342, 386, 387, 388, 222/389–393, 325, 326, 327, 332, 409; 92/162 R, 162 P, 181 R, 181 P; 239/321, 322; 128/218 R, 218 P, 261; 417/435; 188/316; 138/42; 254/158, 160; 267/64 R, 64 A, 64 B, 65 R, 65 A, 65 B, 65 C, 65 D

[56] References Cited

U.S. PATENT DOCUMENTS

| 1,320,976 | 11/1919 | Black | 222/387 |
| 1,395,302 | 11/1921 | Shalkop | 222/326 |
| 2,823,915 | 2/1958 | Bourcier De Carbon | 267/64 R X |
| 3,227,435 | 1/1966 | Greer | 267/64 R X |
| 3,255,936 | 6/1966 | Healy et al. | 222/389 |
| 3,381,863 | 5/1968 | Towns | 222/389 X |
| 3,442,424 | 5/1969 | Prussin et al. | 222/389 X |
| 3,663,071 | 5/1972 | Kates | 92/162 X |
| 4,045,938 | 9/1977 | Hansen | 222/389 X |

FOREIGN PATENT DOCUMENTS 643600  6/1962  Canada .................................. 222/386

Primary Examiner—Stanley H. Tollberg
Assistant Examiner—Fred A. Silverberg
Attorney, Agent, or Firm—Dowell & Dowell

[57] ABSTRACT

A piston apparatus used with a barrier pressure container for dispensing flowable material. The portion of the piston which engages the material to be dispensed is vented to prevent the entrapment of gases when the container is being filled with the flowable material.

6 Claims, 6 Drawing Figures

U.S. Patent  Jan. 16, 1979  4,134,523
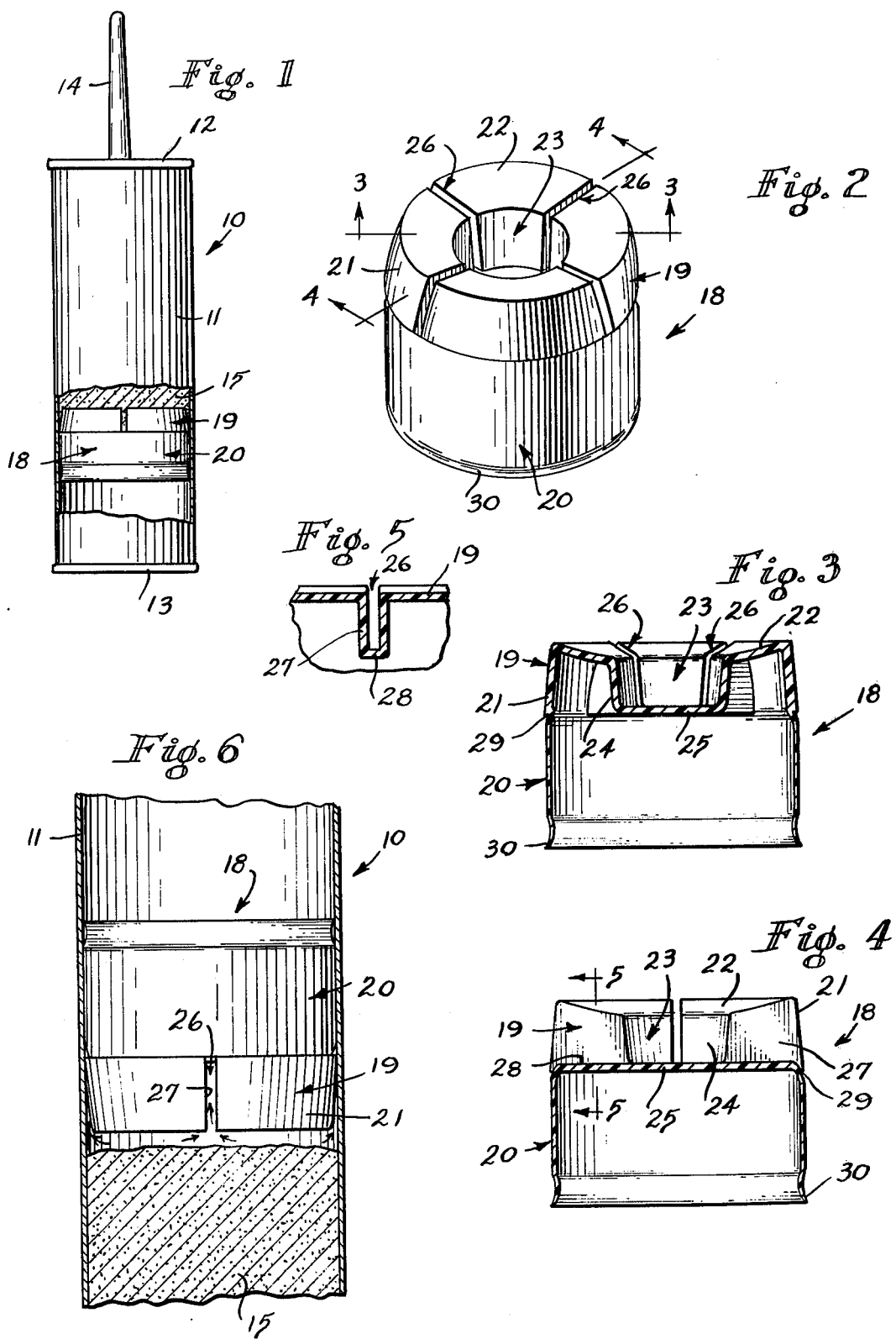

4,134,523

VENTED PISTON FOR BARRIER PRESSURE CONTAINERS

BACKGROUND OF THE INVENTION

1. Field of the Invention

This invention relates generally to the dispensing of material under pressure and relates particularly to a piston used with a barrier pressure container in which material to be dispensed is located on one side of the piston and fluid under pressure is disposed on the opposite side of the piston.

2. Description of the Prior Art

Heretofore many efforts have been made to dispense material from relatively small containers by means of pressurized fluids. Generally these prior art methods have fallen into three categories. The first category has been the aerosol type in which a liquid or gas is mixed with a hydrocarbon such as freon or the like having a low boiling point. When the valve of the container is operated, the pressure within the container is relieved so that some of the hydrocarbon boils off and causes the gas or liquid within the container to be sprayed through the discharge opening.

The second category of dispensers has been of the barrier pressure type in which the container is divided into first and second compartments by a movable piston. The material to be dispensed is disposed within one of the compartments and the other compartment is provided with a gas, such as air, under pressure. In this type of construction, when the dispensing valve is open, the gas under pressure moves the piston against the material to be dispensed and causes such material to be discharged through the valve.

The third category includes a container having a flexible collapsible bag therein and such bag receives the material to be dispensed while the area within the container and exteriorly of the bag is filled with fluid under pressure. A dispensing valve communicates with the interior of the bag so that when the dispensing valve is open the fluid under pressure within the container squeezes inwardly on the bag and causes material to be dispensed.

The present invention is concerned only with the second category of dispensers in which the container is provided with a movable piston for dispensing material.

In the past, it has been difficult to fill barrier pressure containers with material to be dispensed without trapping air or other gas within the container. The entrapment of air has caused many problems, particularly when dispensing viscous materials such as caulking compound and the like from a barrier pressure container, since the material is introduced into the container while the container is in a non-pressurized condition. Any air which is trapped within the material compartment of the container during the filling process becomes pressurized when the area on the opposite side of the piston is pressurized since the piston compacts such material. If the pressurized air in the material compartment is located at the top adjacent to the discharge nozzle, such air is discharged as soon as the valve is operated and causes material to spatter over a wide area. Any air trapped adjacent to the piston will be compressed and normally such compressed air escapes through the discharge valve when most of the contents of the container have been dispensed and causes material being dispensed to spatter.

Any air trapped in the material may have a deleterious effect on both material and container, particularly if the material and container are sensitive to oxygen. As an example, caulking compound begins to cure when subjected to oxygen in the air and such curing makes the dispensing of the product more difficult. Air trapped in the container and exposed to the inner wall of such container may cause oxidation, particularly in the area of the side seam.

In order to dispense substantially all of the material from the container, many pistons have been provided with an upper surface having a configuration generally corresponding to the configuration of the inner surface of the top of the container. Since the dispensing valve normally extends into the container, these pistons have been provided with a central recess to accomodate the inner portion of the dispensing valve.

When material to be dispensed is being introduced into the containers, the filling operation can be either a top filling or a bottom filling operation. In a top filling operation the bottom wall of the container and the piston are placed within the container and the container is arranged along a generally vertical axis so that a filling tube can be inserted into the container substantially to the upper surface of the piston and thereafter the filling tube is withdrawn as material is being discharged into the container. The rate of withdrawal of the filling tube normally is complementary to the flow of material into the container. After a predetermined quantity of material has been discharged into the container, the filling tube is removed and a top wall, normally having a discharge valve therein, is attached to the container in any desired manner, as by crimping, welding or the like. When the piston has a central recess or cup for receiving the inner portion of the dispensing valve, air has frequently been trapped within such cup during the filling operation and such air has been compressed when the area below the piston was subsequently pressurized.

In the bottom filling of a container, the top wall of the container is applied and the container is inverted so that the top wall and the valve are located at the bottom, while the body of the container is disposed along a generally vertical axis. Thereafter a filling tube is inserted through the open bottom of the container and material is discharged into the container as the filling tube is withdrawn. When the container has been substantially two-thirds filled, the introduction of material is interrupted and the filling tube is removed. Thereafter the piston is pushed into the container until the piston engages the material to be dispensed. During this movement air trapped between the piston and the material is easily forced past the side walls of the piston since the area behind the piston has not been pressurized. However, air trapped within the central recess or cup is sealed therein by the material as soon as the piston engages such material and therefore the air trapped within the cup cannot escape.

SUMMARY OF THE INVENTION

The present invention is embodied in a piston for use with a barrier pressure container in which the upper surface of the piston is of a configuration generally complementary to the inner surface of the top wall of the container and such piston is provided with a central recess or cup generally complementary to the inner portion of the dispensing valve so that at least most of the material in the container can be dispensed. In order to avoid the entrapment of air between the piston and the material to be dispensed, the upper portion of the piston is provided with a plurality of generally radially disposed slots which permit air from the cup to escape to the outer periphery of the piston where such air may be discharged. Such piston can be effectively utilized regardless of whether the container is being top filled or bottom filled.

It is an object of the present invention to provide a vented piston for use with a pressurized barrier container and which substantially prevents the trapping of air within the container.

BRIEF DESCRIPTION OF THE DRAWING

FIG. 1 is a side elevation of a barrier pressure container with portions broken away and illustrating one application of the invention.

FIG. 2 is a perspective view of the piston per se.
FIG. 3 is a section on the line 3—3 of FIG. 2.
FIG. 4 is a section on the line 4—4 of FIG. 2.
FIG. 5 is a section on the line 5—5 of FIG. 4.
FIG. 6 is a fragmentary vertical section of a barrier pressure container illustrating the piston being inserted into the container.

DESCRIPTION OF THE PREFERRED EMBODIMENT

With continued reference to the drawing, a barrier pressure container 10 is provided having a generally cylindrical body 11 which is closed at opposite ends by a top wall 12 and a bottom wall 13. The top wall includes a conventional dispensing valve 14 of the type which is tilted to dispense material from the container. Preferably the material within the container is a viscous material 15 such as caulking compound, creams, lotions, gels, or the like.

With particular reference to FIG. 1, the container 10 is provided with a piston 18 which is movably mounted axially of such container and separates the container into upper and lower compartments. The upper compartment contains the material 15 while the lower compartment is provided with fluid under pressure such as air or gas which urges the piston upwardly against the material 15. The fluid under pressure in the lower portion of the container is inserted in any conventional manner (not shown).

With particular reference to FIGS. 2-4, the piston 18 is molded of a flexible thermoplastic material such as low density polyethylene, polypropylene or the like and includes a hollow upper portion or head 19 and a generally cylindrical lower portion or skirt 20. The head 19 is constructed of relatively thick material so that the head substantially retains its shape when applying a pushing force to the material 15 and the skirt 20 is constructed of relatively thin material so that such skirt is easily deformable against the side walls of the container 10 by the pressure of air or other fluid in the lower compartment of the container.

The head 19 includes an upwardly curved side wall 21 connected at its upper end to an inwardly extending, downwardly dished top or end wall 22. The dished end wall is generally complementary to the inner surface of a concave top wall 12. However, if the top wall has a flat or convex inner surface, the end wall 22 of the piston will be complementary to such configuration. The central portion of the head 19 is provided with a central recess or cup 23 defined by a side wall 24 which is generally concentric with the side wall 21. The side wall 24 is connected at its upper end to the end wall 22 and connected at its lower end to an imperforate bottom wall 25. The recess or cup 23 is of a size to accommodate the portions of the dispensing valve 14 which extend into the container 10.

Normally, since the end wall 22 is dished inwardly, as soon as the piston head 19 engages the viscous material 15, air would be trapped within the upper portion of the piston 18 and within the cup 23 and such air would be compressed when the piston was forced against such material. In order to avoid the entrapment of air within the upper portion of the piston, a plurality of slots or grooves 26 are provided which provide communication between the cup 23 and the exterior of the side wall 21 of the head. Each of the slots is defined by a pair of spaced generally parallel side walls 27 connected by a bottom wall 28 which constitutes an extension of the bottom wall 25 of the cup.

The skirt 20 is integrally connected to the head 19 and defines an overhang or shoulder 29 at the point of connection. Such shoulder defines an extraction groove for removing the piston from the molding apparatus and also defines a stepped configuration which slidably and sealingly engages the inner periphery of the container body 11. Additionally, as shown best in FIG. 4, the slots 26 communicate with the stepped shoulder 29 so that air which is forced from the cup 23 is distributed around the periphery of the skirt 20. The lower edge of the skirt 20 is provided with an outwardly curved feathered flange 30 to insure sealing engagement between the skirt and the inner periphery of the body 11 of the container at all times.

In the operation of the device, when the container 10 has been filled from the bottom, the piston 18 is pushed through the open bottom into the container 10. As soon as the head 19 enters the container, air between the piston 18 and the material 15 is trapped so that continued downward movement of the piston tends to compress the trapped air. Since the piston is constructed of flexible material and since the space on the side of the piston remote from the material has not been pressurized, the trapped air bypasses the piston and is discharged to atmosphere. When the end wall 22 engages the material, any air trapped within the cup 23 is discharged through the slots 26 after which such air bypasses the skirt 20 and is discharged from the container. Since no air can be trapped and compressed within the cup 23, inward movement of the piston continues until the cup 23 and the slots 26 are filled with material. Thereafter the bottom wall 13 is attached to the body 11 of the container in any desired manner, as by crimping or the like, and the area between the piston 18 and the bottom wall 13 is pressurized by the introduction of air or other fluid under pressure in a conventional manner.

When the container is to be filled from the top, the piston 18 is inserted and the container is positioned with the body along a generally vertical axis with the open top uppermost. In this position a filling tube is inserted into the container with the discharge end of such filling tube located adjacent to the piston 18. Thereafter a predetermined quantity of material 15 is discharged into the container. During the initial introduction of the material into the container, the filling tube is located above the cup 23 and such cup is filled first. However, no air can be trapped within the cup since such air flows through the slots 26 and is discharged upwardly along the sides of the inflowing material. When a predetermined quantity of material has been introduced into the container as the filling tube is being withdrawn, the introduction of material is interrupted and thereafter the top wall 12 with or without a dispensing valve 14 connected thereto is attached to the open end of the body 11. Thereafter the area between the piston and the bottom wall 13 of the container is pressurized by the introduction of air or other fluid under pressure in a conventional manner.

The pressurizing of the lower portion of the container forces the skirt 20 outwardly into intimate engagement with the inner periphery of the body 11 to form a sliding seal between the same. Due to the flexible material of the piston, the head 19 and the skirt 20 of the piston may be deformed to pass any dents or inwardly extending projections which may occur in the body 11 during storage or use of the container.

It is noted that certain petroleum based chemical products may have some tendency to be absorbed by the thermoplastic material of the piston which causes such material to swell. In this event the slots 26 permit the thermoplastic material to partially close such slots without substantially increasing the frictional resistance of the piston through the container.

We claim:

1. A vented piston for dividing a barrier pressure container into a first compartment which receives material to be dispensed and a second compartment which receives fluid under pressure, said piston comprising a semi-rigid head portion which normally retains its shape and which is integrally connected to a flexible deformable skirt portion, said head portion including a side wall and an end wall, said side wall of said head portion and said skirt portion slidably engaging the inner periphery of said container, said end wall having cup means located generally axially of said piston and extending from said end wall toward said skirt portion, and slot means providing communication between said cup means and the exterior of said side wall, at least a portion of said slot means terminating adjacent to the connection between said head portion and said skirt portion so that air trapped within said first compartment of said container is discharged through said slot means and past said skirt portion into said second compartment, whereby substantially all free air is exhausted from said first compartment.

2. The structure of claim 1 in which said cup means includes a second side wall connected at one end to said end wall and connected at the other end to a bottom wall, said slot means extending downwardly from said end wall at least as far as said bottom wall of said cup means.

3. The structure of claim 1 in which said slot means includes a plurality of slots extending generally radially from said cup means to the exterior of said side wall.

4. The structure of claim 1 in which said piston is constructed of resilient thermoplastic material.

5. A vented piston for dividing a barrier pressure container having a substantially rigid, generally cylindrical wall into a first compartment which receives material to be dispensed and a second compartment which receives fluid under pressure, said piston comprising a semi-rigid imperforate head which normally retains its shape and which is integrally connected to a flexible deformable skirt, said head including a side wall and an end wall, a portion of the outer periphery of said side wall of said head and the entire outer periphery of said skirt slidably engaging the inner periphery of said container, and slot means located in said head only providing communication between the central portion of said end wall and the exterior of said side wall, at least a portion of said slot means terminating adjacent to the connection between said head and said skirt so that air trapped within said first compartment of said container is discharged through said slot means and subsequently past said skirt into said second compartment when relative movement occurs between said piston and the material in said first compartment, whereby substantially all free air is exhausted from said first compartment.

6. In a barrier pressure container having a dispensing valve at one end and a piston separating the container into a first compartment for receiving a viscous material to be dispensed and a second compartment for receiving fluid under pressure, the improvement comprising, said piston having a semi-rigid head portion integrally connected to a flexible skirt portion, said head portion including an exterior side wall, said exterior side wall and said skirt portion slidably engaging the inner periphery of the container, an inwardly dished end wall connected to said exterior side wall, cup means located generally axially of said piston, said cup means including an inner generally cylindrical side wall located substantially concentrically of said exterior side wall, an imperforate bottom wall connected to said inner side wall, a plurality of slots providing communication between said inner and outer side walls, each of said slots being generally U-shaped in cross-section and having a lower wall located substantially in the same plane as said bottom wall, said lower wall of each slot terminating adjacent to the connection between said head portion and said skirt portion so that free air trapped within said first compartment between the viscous material and said head portion is forced through said slots and past said flexible skirt portion into said second compartment when relative movement occurs between said piston and the viscous material, whereby substantially all free air is exhausted from said first compartment.

* * * * *